Figure 3:
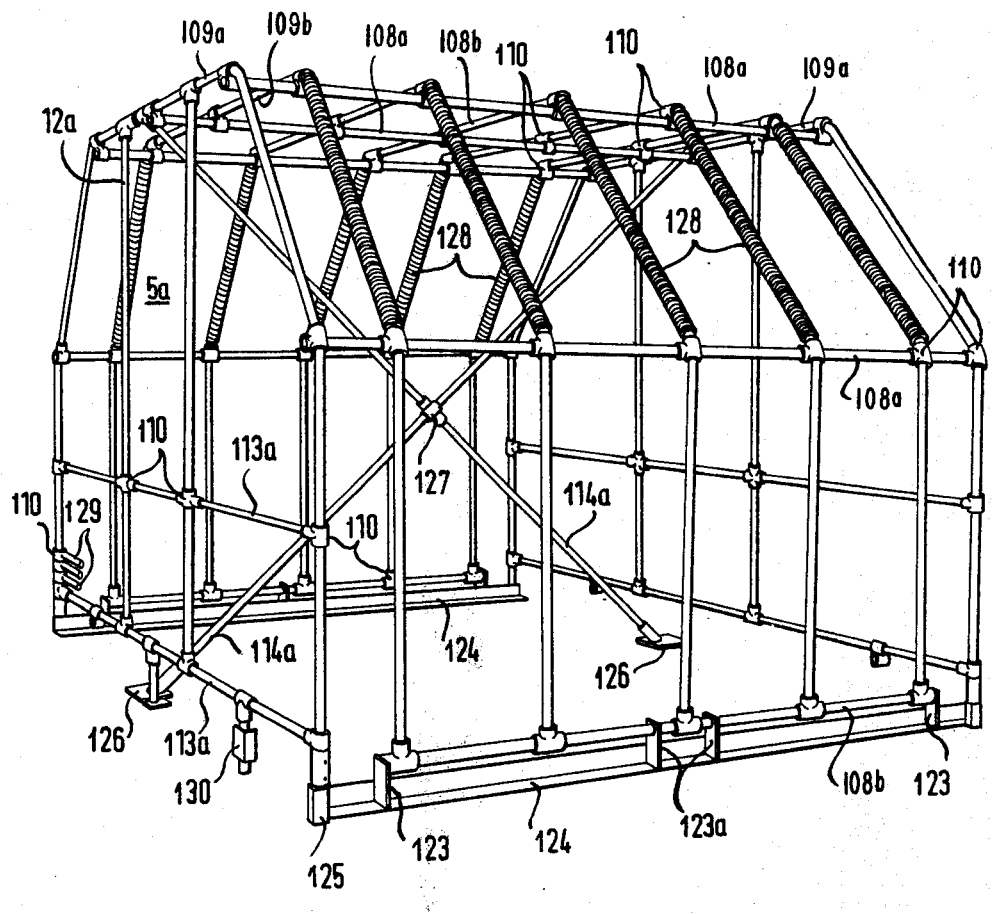

United States Patent [19]
Rennemann

[11] 3,999,727
[45] Dec. 28, 1976

[54] AIR FREIGHT CONTAINER
[75] Inventor: Albert Rennemann, Helleweg, Germany
[73] Assignee: Johann Birkart, Internationale Spedition, Aschaffenburg, Germany
[22] Filed: Mar. 3, 1975
[21] Appl. No.: 555,055
[52] U.S. Cl. .......................... 244/118 R; 211/182; 206/285; 312/6
[51] Int. Cl.² ...................... B64D 9/00; A47F 5/00
[58] Field of Search ............. 211/182, 105.3, 123; 312/6, 3; 244/118 R; 206/285

[56] References Cited
UNITED STATES PATENTS

| | | | |
|---|---|---|---|
| 968,352 | 8/1910 | Hermann | 312/3 |
| 1,569,358 | 1/1926 | Cross | 211/182 |
| 1,828,535 | 10/1931 | Kass | 312/3 |
| 2,897,911 | 8/1959 | Bowers | 211/182 X |
| 3,093,092 | 6/1963 | Martin et al. | 244/118 R X |
| 3,171,541 | 3/1965 | Weisberger | 211/182 X |
| 3,294,034 | 12/1966 | Bodenheimer et al. | 220/1.5 X |
| 3,334,737 | 8/1967 | Dreyfus | 206/497 |
| 3,481,483 | 12/1969 | Harvey et al. | 211/123 X |

FOREIGN PATENTS OR APPLICATIONS

| | | | |
|---|---|---|---|
| 142,555 | 5/1920 | United Kingdom | 312/6 |

Primary Examiner—Leonard Summer
Attorney, Agent, or Firm—Toren, McGeady and Stanger

[57] ABSTRACT

An air freight container for shipping goods, such as garments which are transported in the suspended position, is formed of an open scaffold-like frame. The frame is shaped to conform to the interior contour of the freight space in a transport aircraft. The frame includes a floor or base part, end frame parts which extend upwardly from the base part and are disposed in spaced relation to one another, transverse connectors located above the base part and extending between adjacent end frame parts, and diagonal struts connected between the base part and the crown portion of the end frame parts. The various parts of the frame are all formed of pipe sections having the same transverse shape and the various parts are secured together by connectors formed of rigidly connected sleeves which have an interior shape conforming to the exterior shape of the pipe sections which they interconnect. Screw members are threaded into the connector sleeves for securing the sleeves to the pipe sections.

13 Claims, 9 Drawing Figures

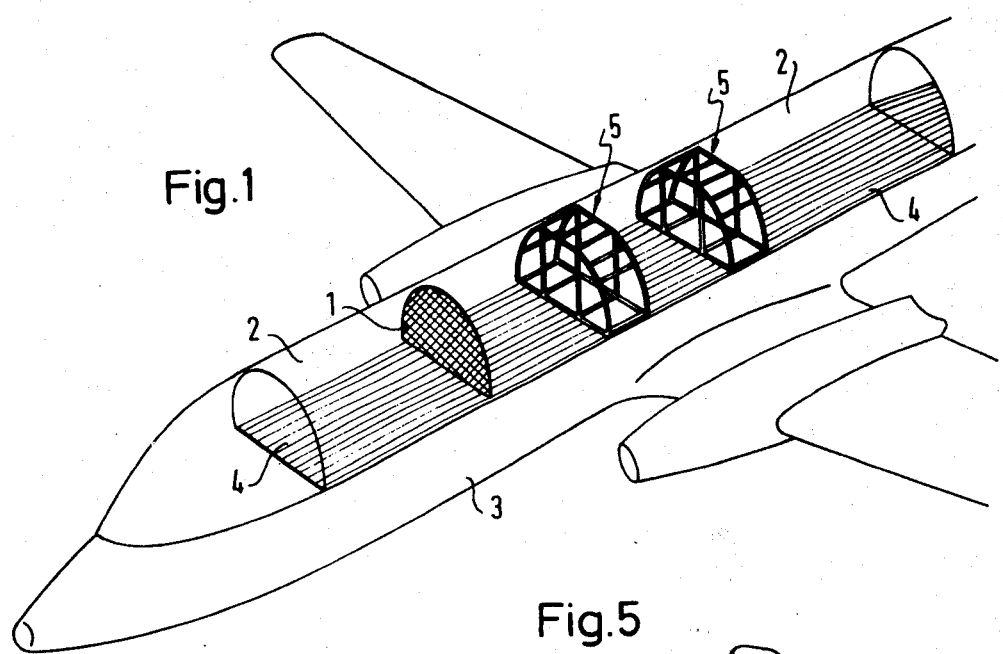
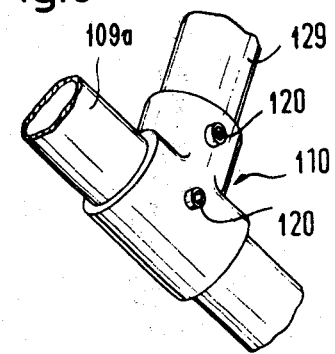
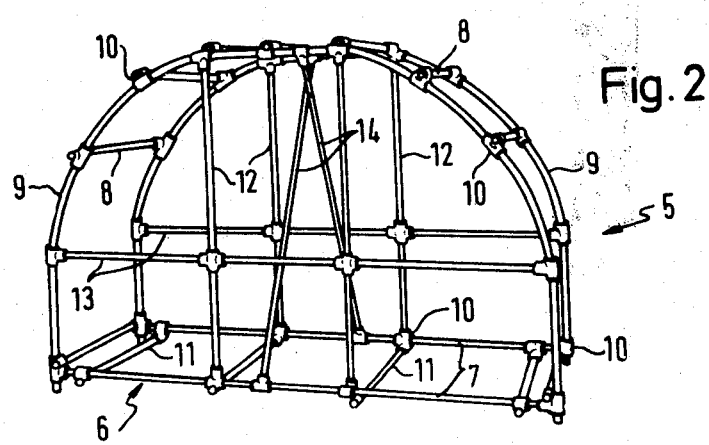

AIR FREIGHT CONTAINER

This invention relates to a container for the freighting of pressure-sensitive goods which are to be transported suspended, such as garments of the like, and relates especially to a container suitable for air freight traffic, the peripheral contours of which are determined basically by the internal cross-sectional contour of the principal freight hold of transportation aircraft, and which, while achieving optimum weight-volume ratio, ensures the best possible utilisation of the container volume even where the freighted goods may have varying dimensions.

Containers are usually employed where bulk goods must be freighted over large distances via a chain of transportation means, such as road vehicles, railways, aircraft and the like, with the best possible utilisation of a limited available transportation volume and as far as possible without loading or unloading. For pressure-sensitive goods, such as garments or the like, only a suspended method of transportation can be considered, since these goods, if transported lying flat and especially stacked one above another, would exhibit at the end of the journey compressed regions and creases which could only be removed at considerable expense, if indeed at all. To transport such goods in stiff containers, for example boxes, is firstly very expensive in regard to the packaging material required and secondly must be excluded if the best possible utilisation of the available and limited transportation volume is to be achieved.

Containers for the suspended transportation of pressure-sensitive goods, such as garmets, especially for land or sea freight are indeed already known, but these are always containers of solid construction, the dimensions of which are standardised and designed for fitting into road trucks or railway wagons and, in regard to the stresses, especially when handled by cranes or the like, possess a high intrinsic stiffness which is incompatible with air freight traffic. Because of the intrinsic stiffness required for land and sea transportation, and especially for the cargo handling facilities such as lifting slings at present in use, those containers which are at present known and in common use possess a self-weight which makes them unsuitable for air freight traffic.

The term "pressure-sensitive goods" used throughout in this context is not intended to designate exclusively textiles, but certainly comprises other goods also, such as fresh meat, which also cannot be transported lying flat over long distances.

The task underlying the invention is to create a container suitable for the suspended freighting of pressure-sensitive goods, especially in aircraft which, with the minimum possible self-weight, on the one hand makes possible optimum utilisation of the available transporting space or container volume even for the transportation of different types of goods, and which on the other hand can easily be collapsed into an empty transportation position occupying only a fraction of its useful volume, without thereby giving rise to loose components, and which finally can be made at the minimum possible expense and can be secured onto standardised air freight pallets.

The essential characteristic of an air freight container according to this invention consists in that the container is constituted of a scaffolding frame, capable of accepting twist to a certain degree, and consisting of a number of mutually identical upstanding component frames arranged at intervals, joined together by transverse connectors, and dimensioned in their peripheral contour to suit the internal cross-sectional contour of the principal freight space of aircraft, whereby the component frames as a whole are disposed vertically upstanding on a rectangular base area and the transverse connectors joining the component frames together are disposed in the curved contour plane of the container. The component frames are constituted of integral tubes curved to suit the internal cross-sectional contour of the principal freight space of aircraft and the transverse connectors and other stiffening elements are constituted of straight tubes, these being all joined together by means of detachable connecting elements. For the purpose of collapsibility of the container to a fraction of its useful volume, the connecting means for joining the component frames to the transverse connectors, and also to the other equipment, especially bracing and stiffening of the container, are constituted of tubular sleeves rigidly joined together in cross-formation or T-formation, which are penetrated or traversed by the component frames and transverse connectors or stiffening elements, these being fixed in the tubular sleeves at the desired position by means of grub screws.

In a first and very simple realisation of the invention, the container comprises two component frames serving as end frames, which are disposed vertically upstanding above a floor group of rectangular plan shape and are connected together by a number of transverse connectors, disposed in the contour plane of the container at differing mutual spacings in an adjustable manner, and also serving as hanging bars for the goods to be transported. According to a preferred and more favourable form of embodiment, the container according to this invention comprises a number, especially an uneven number of component frames disposed vertically upstanding on a rectangular base area, the outermost ones of which are rigidly connected as end frames, and the inner ones adjustably connected by releasable connecting means to suit their mutual spacing, to the transverse connectors, whereby the two lower transverse connectors associated with the longitudinal sides of the container are shorter than the total container length and are rigidly joined by supporting parts to profile bars, especially angled bars, which in turn are furnished with devices for the attachment of the container onto standardised loading pallets, conventionally used in air freight traffic and equipped with perforated bars or the like. In this arrangement, the end frames of the container are exclusively connected to the profile bars by plug-in pins rigidly connected to the latter, whereas the inner component frames are adjustably secured to the shortened transverse connectors at mutual intervals suited to the requirements of the particular goods to be transported.

According to a further feature of this invention, there are disposed in the plane of the two end frames of the container horizontally oriented bracing chords and vertically oriented support bracings, constituted of straight lengths of tube and connected together and also to the end frames by releasable connecting means, and furthermore each of the two end frames of the container is supported by a diagonal brace, especially centrally disposed, from the opposite longitudinal chord of a floor group and/or the lower bracing chord of the opposite end frame, in such a manner that these two diagonal braces cross each other in the spatial centre of the container. This ensures, on the one hand an end closure to the container volume, and on the other hand, while allowing for a certain capacity to twist within the container, a sufficient stability in the scaffolding construction constituting the container.

In order to facilitate simple loading of the container with garments in a position oriented transversely to its end surface, at least the inner component frames are furnished at least in the upper region of the container, with devices for the non-slip suspension of coat-hangers or suspension frames, these being formed especially of shrunk-on corrugated tubes of plastic. In a further improvement of an air freight container, the invention comprises finally also the optional provision of push-in rollers (castors) or rigid base plates fitted onto the free ends of its end frames and comprises covering of the container with a hood of net material or flat material, and also its securing to a rigid base tray.

Figure 4:
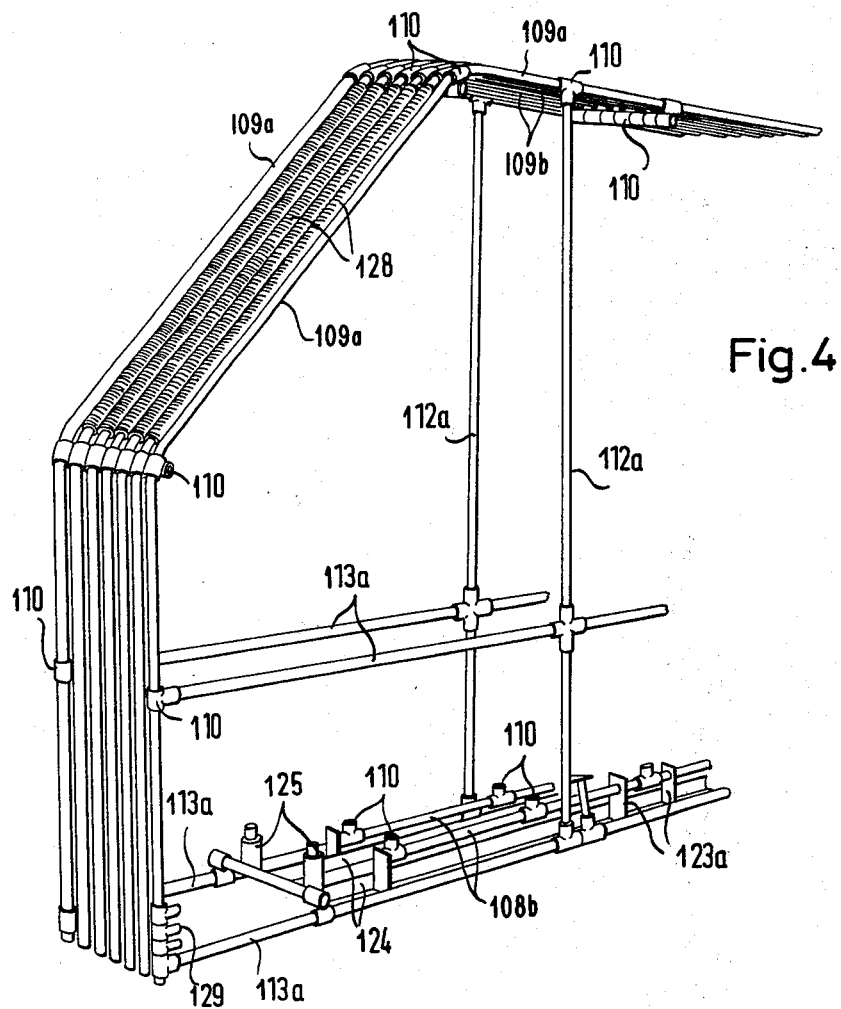
Figure 9:
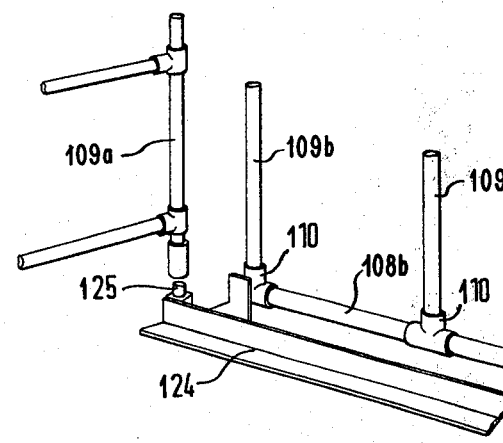
Figure 7:
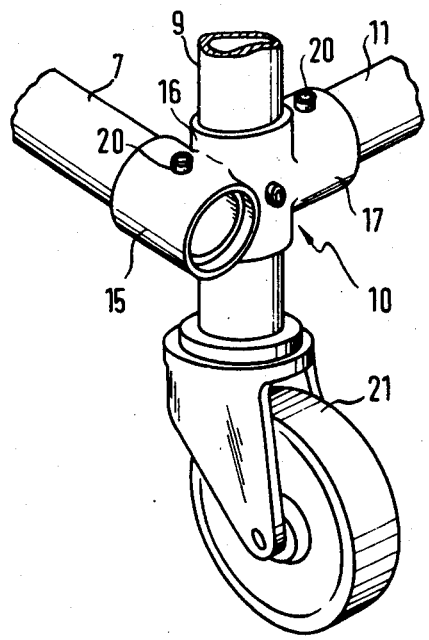
Figure 8:
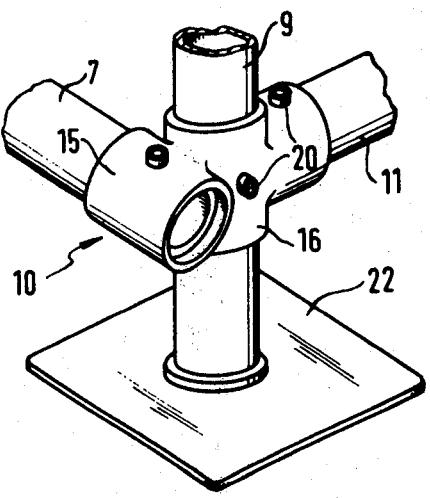
Figure 6:
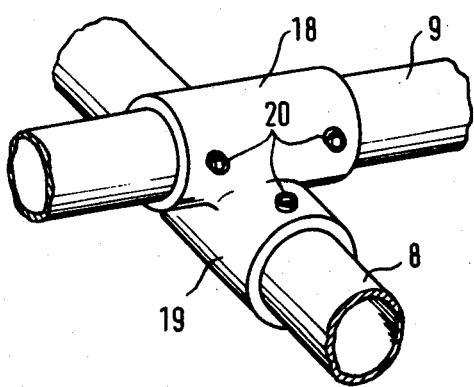

Further details and features of this invention will become apparent from the claims in conjunction with the following description of the examples of embodiment illustrated in the drawings. In the drawings the figures show FIG. 1 a diagrammatic perspective view of a freight aircraft partially loaded with containers according to this invention;

FIG. 2 a perspective view of the first and simplest realisation of a container according to this invention;

FIG. 3 a perspective view of a preferred, second realisation of a container according to this invention;

FIG. 4 a diagrammatic perspective view of the container of the invention according to FIG. 2 in its collapsed transportation position;

FIG. 5 a perspective view of a connecting means for the lengths of tube of a container according to this invention, constituted of tubular sleeves rigidly joined together in cross-wise manner;

FIG. 6 a likewise perspective view of a connecting means for the lengths of tube of a container according to this invention, constituted of tubular sleeves rigidly joined together;

FIG. 7 a perspective view of the connection of a plug-in castor to the scaffolding frame of a container according to this invention;

FIG. 8 a perspective view of the junction of a rigid base plate to the scaffolding frame of a container according to this invention;

FIG. 9 a perspective view of a portion of FIG. 3, to enlarged scale with the parts shown in separated relationship.

In the principal freight space 2 of a transportation aircraft 3, subdivided longitudinally by arrester nets 1, containers 5 can be pushed in from the stern of the aircraft on loading pallets, not shown in the drawing, and roller bars 4, these containers in turn being anchored on the loading pallets by grating bars formed of perforated bars and by so-called Kec-clamps. In their simplest form of realisation according to FIGS. 1 and 2, the containers 5 each consist of a floor group 6 and of end frames 9, upstanding from its longitudinal chords 7, and connected together by transverse connectors 8, whereby the floor group 6 and the end frames 9, and also the transverse connectors 8 disposed in the contour plane of the container and also constituting hanger bars for the transported goods, are formed of lengths of tube and are detachably and adjustably connected to one another by connecting means 10, constituted of tubular sleeves rigidly joined to one another in cross-formation or T-formation. The floor group 6 consists of longitudinal chords 7 and transverse members 11, which are joined together by releasable connecting means 10 and constitute a frame of rectangular plan shape. The end frames 9 of the container are stiffened by means of horizontally oriented bracing chords 13 and vertically oriented support bracings 12, joined both to one another and to the end frames 9 by releasable connecting means 10, and are further supported, to increase the overall strength of the container, by diagonal braces 14, each disposed centrally and engaging on the opposite longitudinal chord 7 of the floor group 6. By the agency of the detachable connecting means 10, the transverse connectors 8 are adjustably secured, at mutual spacings to suit the particular nature of the goods transported, to the end frames 9 constituted of the integral pieces of tube curved to suit the internal cross-sectional contour of the principal freight space of the transportation aircraft 3.

The connecting means 10 consist of tubular sleeves 15, 16, 17 and 18, 19 respectively, rigidly joined together in cross-formation or T-formation, through which pass the lengths of tube 7 to 14 constituting the components of the container 5, and in which the lengths of tube 7 to 14 can be secured at any desired position by means of grub screws 20. The connecting means 10, especially the tubular sleeves 15 to 19 constituting them, may favourably be formed as integral injection moulded components and make possible simple mutual adjustment, as desired, between the individual components 7 to 14 of the container, in such a way that the mutual spacings of the components can be adjusted both to the available freight space and also to the hanging widths specified for the transported goods, and also such that folding or collapsing of the container into an empty transportation position corresponding to a fraction of its useful volume is ensured. In the example of embodiment of a container according to this invention illustrated in FIG. 1 and especially FIG. 2, when collapsing this container, the transverse connectors 8 which also constitute the hanging bars and the floor group 6, also the diagonal bracings 14, are disconnected from the one end frame 9 and are swung in into the plane of the other end frame 9, a special advantage in this arrangement being that, as a result of the use of grub screws in the connecting means 10, when the connecting means 10 are loosened, no loose individual components result.

In FIGS. 6 to 8, examples of embodiment for the proposed releasable connecting means 10 according to this invention are shown, whereby according to the example of embodiment according to FIG. 6 two tubular sleeves 18 and 19, arranged mutually cross-wise, are rigidly joined together and the entire connecting means 10 is constituted of an integral injection moulded component. The tube lengths 8 and 9 can be secured at any desired positions in the tubular sleeves 18 and 19 by means of the grub screws 20. The examples of embodiment according to FIGS. 7 and 8 show corner connections, in which an additional tubular sleeve 15 is disposed on two tubular sleeves 16 and 17, arranged in T-formation to each other, and wherein these connecting means are constituted in total of an integral injection moulded component 10. In the tubular sleeves 15, 16, and 17, lengths of tube 7, 9, 11 forming parts of the container 5 can be fixed by means of the grub screws 20 at the desired positions of insertion. In the example of embodiment according to FIG. 7, moreover, the arrangement of a plug-in castor 21 at the free end of an end frame 9 of the container 5 is shown. In the example of embodiment according to FIG. 7, the arrangement is likewise shown of a rigid base plate 22 fitted onto the free end of an end frame 9 of the container 5.

In the form of embodiment as shown in FIGS. 3, 4, 5 and 9, the container 5a comprises a number of mutually identical vertically upstanding component frames 109a and 109b on a rectangular base area, the outermost of which as end frames 109a are rigidly connected, and the inner ones 109b are connected by detachable connecting means 110, at adjustable mutual spacings to the transverse connectors 108a and 108b. The transverse connectors 108a and 108b are constituted of straight lengths of tube, whereby the transverse connectors 108a disposed over the upper region of the container contour are exclusively connected to the component frames 109a and 109b by releasable connecting means 110, whereas the two lower transverse connectors 108b are joined by means of supporting members 123 rigidly to profile bars constituted of angle sections 124, which in turn are furnished with devices, not shown in more detail in the drawing, for fixing to the loading pallets, conventionally used in air freight traffic, which are equipped with perforated bars or the like. The two end frames 109a of the container 5a are exclusively connected to the profile bars 124 by plug-in pins 125 rigidly attached to the latter, whereas the inner component frames 109b are adjustable in their mutual spacings by means of releasable connecting means 110 and can be secured to the shortened lower transverse connectors 108b. In a preferred manner, two supporting members 123a for the lower transverse connector 108b are disposed in the central region of the container 5a at a slight distance from one another such that the central component frame 109b can only be adjusted within narrow limits. In this form of embodiment also, the end frames 109a are stiffened by horizontally oriented bracing chords 113a and vertically oriented support bracings 112a, disposed in the plane of the frames, formed of straight tube lengths and joined both to each other and also to the end frames by releasable connecting means 110, and are supported by means of diagonal bracings 114a, which engage on the one hand by releasable connecting means 110 to the end frames 109a and on the other hand are secured by fixing plates 126 to the loading pallet. The diagonal bracings 114a cross each other in the spatial centre of the container 5a and are joined to each other at this position by a suitably formed, releasable connecting means 127. The inner component frames 109b possess, at least in their portions inclined to the horizontal, devices 128, formed of shrunk-on corrugated plastic tubing, for the slip-free suspension of coat-hangers or suspending frames.

For return transportation as empty goods, the container 5a can be collapsed to a fraction, especially one-sixth, of its useful volume, whereby in the first place except for the stiffening members 112a and 113a of the end frames 109a, all of the releasable connecting means 110 are loosened and both the transverse connectors 108a and 108b and also the diagonal supports 114a are removed. Instead of the transverse connectors 108a and 108b, short tube lengths 129, fitted to pivot horizontally on one of the end frames 109a, are inserted into the connecting means 110 remaining on the component frames 109a and 109b, and at least the connecting means 110 of the opposite end frame 109a are again tightened up. At the same time, the profile bars 124 together with the lower transverse connectors 108b rigidly connected to them are combined by means of short angle bar sections 130 attached pivotally to the lower bracing chords 113a of the end frames 109a to form a unit oriented parallel to the component frames 109a and 109b in the transportation position.

The containers 5 or 5a can, in a favourable embodiment of this invention, be covered with a hood of net or sheet material suitably shaped to fit them and, if required, also be fitted with a rigid floor tray attached at least to their end frames 9 and 109a.

I claim:

1. An air freight container for shipping pressure-sensitive goods, such as garments which are transported in the suspended position, comprising a scaffold-like frame having a torsional capacity within certain limits, said frame being positionable within the principal freight space of a transport aircraft which freight space extends in the elongated direction of the aircraft, said frame comprising a rectangular base part arranged to extend transversely of and in the elongated direction of the freight space, at least two end frame parts arranged to extend transversely of the elongated direction of the freight space and spaced apart in the elongated direction thereof, said end parts shaped to conform to the interior contour of the freight space and being mounted on and extending upwardly from said base part, a plurality of transverse connectors connected to and extending in the elongated direction of the freight space between said end frame parts and spaced above said base part, diagonal braces each having a lower end secured to said base part and an upper end secured to one of said end frame parts, said diagonal braces extending upwardly from said base part in the elongated direction of the freight space, each said end frame part comprising a plurality of pipe sections including first pipe sections extending upwardly from said base part and second pipe sections extending upwardly from the upper ends of said first pipe sections and disposed angularly to said first pipe sections and being shaped in the transverse direction of the freight space to conform to the interior shape of the freight space, said base part comprising third pipe sections extending in the elongated direction of said freight space and fourth pipe sections extending transversely of said third pipe sections, said third and fourth pipe sections having the same transverse cross sectional shape as said first and second pipe sections of said end frame parts, said transverse connectors having the same transverse cross sectional shape as said pipe sections forming said end frame parts and said base part, and connecting means interconnecting said base parts and said end frame parts, said end frame parts and said transverse connectors, and said diagonal braces to said base parts and said end frame parts, said connecting means comprising rigidly connected sleeves with the interior shape of the sleeves conforming to the exterior shape of said pipe sections forming said base part and said end frame parts and to the exterior shape of said transverse connectors and diagonal braces, and threaded members threaded into said sleeves for securing said base part, end frame parts, transverse connectors and diagonal struts therein.

2. An air freight container, as set forth in claim 1, wherein round pipe sections all of the same transverse cross sectional shape form said pipe sections of said base part, said end frame parts, said transverse connectors and said diagonal struts.

3. An air freight container, as set forth in claim 2, wherein said first pipe sections are rectilinear and said second pipe sections are curvilinear arranged to conform to the interior shape of the freight space, said transverse connections extending between the first and second pipe sections of said end frame parts being rectilinear and said diagonal struts being rectilinear, and said transverse connectors arranged to serve as hanging rods.

4. An air freight container, as set forth in claim 2, wherein intermediate frame parts are located between said end frame parts and include fifth pipe sections extending vertically upwardly and sixth pipe sections disposed angularly to said fifth pipe sections for conforming to the interior shape of said freight space and said fifth and sixth pipe sections of said intermediate frame parts being interconnected to said transverse connectors by said connecting means.

5. An air freight container, as set forth in claim 2, wherein said end frame parts include at least one upwardly extending support bracing spaced from said first pipe sections and extending in generally parallel relation with said first pipe sections and horizontally arranged bracing chords spaced upwardly above said base part and downwardly below the upper end of said end frame part and extending between said support bracing and said first pipe sections and being interconnected thereto by said connecting means.

6. An air freight container, as set forth in claim 5, wherein said connecting means includes first connecting means interconnecting said end frame parts and said transverse connectors and second connecting means interconnecting said intermediate frame parts and said transverse connectors, and said second connecting means adjustably interconnecting said intermediate frame parts and said transverse connectors.

7. An air freight container, as set forth in claim 6, wherein said transverse connectors interconnect the lower ends of said intermediate frame parts, L-shaped straps arranged to be secured to loading pallets located below said transverse connectors interconnecting the lower ends of said intermediate frame parts, and supporting parts secured to and extending upwardly between said L-shaped straps and said transverse connectors interconnecting the lower ends of said intermediate frame parts.

8. An air freight container, as set forth in claim 7, wherein guide pins extend downwardly from the lower end of said end frame parts to said L-shaped straps and said transverse connectors interconnecting the lower ends of said intermediate frame parts being spaced in the elongated direction of the freight space from said guide pins.

9. An air freight container, as set forth in claim 5, wherein at least some of said sixth pipe sections of said intermediate frame parts are enclosed within shrunk-on corrugated tubes of plastic for effecting the spaced suspension of garment hangers upon said sixth pipe sections.

10. An air freight container, as set forth in claim 5, wherein straight tube lengths and angle bar sections are pivotally secured to and interconnect said end frame parts and intermediate frame parts to said transverse connectors and said diagonal braces.

11. An air freight container, as set forth in claim 2, wherein said diagonal struts are centered between said first pipe sections of said end frame parts, and said connecting means interconnecting said diagonal struts at a location spaced intermediately between the ends thereof connected to said base part and said end frame part.

12. An air freight container, as set forth in claim 2, wherein plugged-in castors are secured to the lower ends of said first pipe sections of said end frame parts.

13. An air freight container, as set forth in claim 2, wherein rigid standing plates are secured to the lower ends of said first pipe sections of said end frame parts.

* * * * *